United States Patent [19]

Gloor

[11] 4,381,073

[45] Apr. 26, 1983

[54] THERMOSTATICALLY CONTROLLED COLD AND HOT WATER MIXER

[76] Inventor: Roland Gloor, Gerbergasse, CH-5726 Unterkulm, Switzerland

[21] Appl. No.: 262,960

[22] Filed: May 12, 1981

[51] Int. Cl.³ .......................................... G05D 23/13
[52] U.S. Cl. .................. 236/12 A; 137/606; 236/12 R
[58] Field of Search ............. 236/12.15, 12.17, 12.19; 137/606

[56] References Cited

U.S. PATENT DOCUMENTS

| 2,578,796 | 12/1951 | Gillette | 137/606 X |
| 2,828,075 | 3/1958 | Panza et al. | 236/12.15 |
| 2,868,220 | 1/1959 | Freeman | 137/606 X |
| 3,112,879 | 12/1963 | Killias | 236/12.15 |
| 3,511,279 | 5/1970 | Hancock | 137/606 X |
| 3,595,474 | 7/1971 | Humpert | 236/12.15 |
| 3,635,252 | 1/1972 | Botnick | 137/606 X |

*Primary Examiner*—William E. Tapolcai
*Attorney, Agent, or Firm*—McGlew and Tuttle

[57] ABSTRACT

A thermostatically controlled mixer of cold and hot water is disclosed which includes separate assemblies for controlling the temperature of the mixed water and the delivered volume of the mixed water. The assemblies include pairs of ceramic discs sealingly mounted against each other with ports extending therethrough which, in alignment, establish flow communication from a respective inlet to the mixing chamber. A thermally responsive element in the mixing chamber regulates the flow of water from the hot water inlet to the mixing chamber.

7 Claims, 3 Drawing Figures

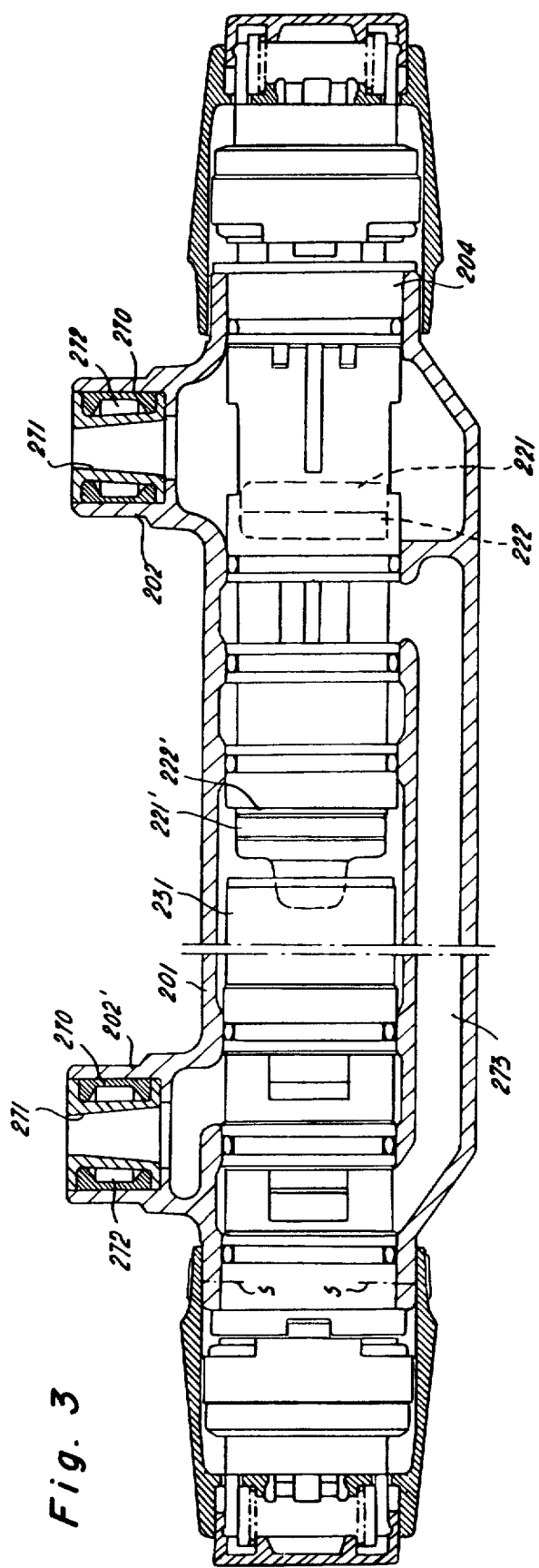

THERMOSTATICALLY CONTROLLED COLD AND HOT WATER MIXER

FIELD AND BACKGROUND OF THE INVENTION

The invention relates in general, to mixing valves and, more particularly, to a new and useful thermostatically controlled mixer of cold and hot water.

Cold and hot water mixer experience has shown that it is advantageous to provide a definite separation of the temperature and volume controls, but also to design the elements performing the two controls as easily mountable and dismountable units. Further, conventional lifting valves have proved to be in many instances, disadvantageous for the volume control.

SUMMARY OF THE INVENTION

The present invention is directed to a mixer of hot and cold water in which separate assemblies for controlling the temperature and delivered volume are provided in the form of a single cartridge or two separate coaxial cartridges which can be mounted in and dismounted from a casing, with the control of the cold water supply and of the hot water supply or mixed water volume discharge being effected each by means of a couple of ceramic discs which are rotatable relative to each other and provided with ports.

Pairs of such discs operating, as is well known, as precision valves hardly subject to wear, make the fitting exactly adjustable and, particularly, disturbance free. It has also proved to be advantageous to conduct the cold water adjacent the wall of the housing that accommodates both of the coaxial assemblies and to cause it to flow, to a large extent, or entirely, around all the inner parts of the fitting conducting hot water or mixed water, and thus to eliminate the potential hazards attendant to a heating of the combination set housing by the hot water.

Accordingly, it is an object of the invention to provide a thermostatically controlled mixer of cold and hot water having separate assemblies for controlling the temperature of the mixed water and the delivered volume. In accordance with a feature of the invention, there is provided a housing having a chamber for mixing the water, a separate cold water inlet and hot water inlet to the chamber, a mixed water outlet from the chamber, a first assembly for controlling the temperature of the mixed water and a second assembly for controlling the delivered volume of the mixed water mounted in said housing in the form of a cartridge separately insertable into and removable from the housing, pairs of ceramic discs mounted against each other for controlling the supply of cold water and the supply of hot water from the respective inlets to the chamber and the volume of delivered mixed water from the chamber, each disc of a pair of ceramic discs being rotatable relative to each other, and each of said ceramic discs having ports for passing of water from a respective inlet to the chamber.

It is a further object of the invention to provide an improved thermostatically controlled mixer of cold and hot water of the type having an elongated housing with an elongated mixing chamber for mixing the cold and hot water, a cold water inlet for passing cold water to the chamber, a hot water inlet for passing hot water to the chamber, a first control cartridge mounted to the housing for regulating the flow of cold water into the mixing chamber and a second control cartridge mounted to the housing for regulating the flow of cold water into the mixing chamber, the improvement wherein the first cartridge comprises a first pair of ceramic discs rotatably mounted relative to and sealingly against each other, each disc of said first pair of ceramic discs having a port extending therethrough to establish fluid communication from the cold water inlet to the mixing chamber part in alignment thereof, said second cartridge including a second pair of ceramic discs rotatably mounted relative to and sealingly against each other, each disc of said second pair of ceramic discs having a port extending therethrough to establish fluid communication from the hot water inlet to the mixing chamber upon alignment thereof, a thermally responsive element mounted in the mixing chamber and a slide valve connected to said thermally responsive element and slidably mounted in said second cartridge for regulating the flow of said hot water from the hot water inlet to the mixing chamber responsive to the operation of the thermal element.

It is a further object of the invention to provide a thermostatically controlled mixer which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 3 is an axial section which shows a mixer with two separate control assembly cartridges which are not connected to each other.

DETAILED DESCRIPTION

Figure 1:
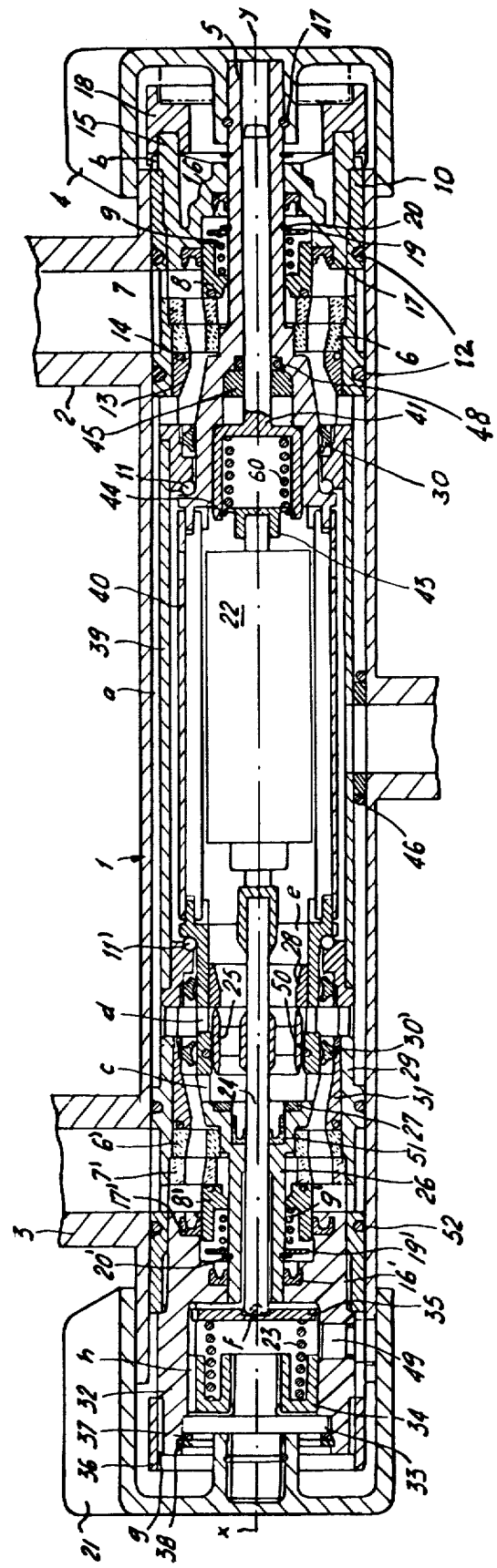
FIG. 1 is an axial section which shows a mixer having temperature and volume control assemblies united as a single cartridge.

Referring now to the drawings, in particular, the invention embodied therein comprises a thermostatically controlled mixer having a housing 1, which may be of a tubular construction, connected to the hot and cold water pipes by means of inlet connections 2 and 3. The entire mixing and regulating mechanism is inserted as a compact cartridge into mixer housing 1 and secured by a locking screw 49. The cold water, as will become evident from the description of the mixer, is directed to flow around almost the entire cartridge to prevent heating of the housing by the hot water.

The flow volume is controlled by turning a plastic volume control knob 4, at the right hand side of the drawing. The turning motion is transmitted through a serrated connection to a rotary part 5. The rotary part 5 acts as the support for the entire cold water control assembly.

The mixer, also known as a combination set, includes as substantial parts two couples of ceramic discs 6 and 7, 6' and 7' which are used for controlling the volume instead of conventional valve seats. The volume is controlled by turning the two discs relative to each other through about ninety degrees. Since the construction is very compact, the entire inner part turns during the volume control. The rotary motion is transferred from rotary part 5 to ceramic disc 7 through a cam ring 8 which is loaded by a helical biasing spring 9 so that the entire cold water control assembly is biased thereby. Due to this bias, the ceramic discs 6,7 can be prefixed in their correct position during assembly. A metal sleeve acts as the outer casing 10 and as the outer race ring of a ball bearing 11 and also as a seat for ceramic disc 6. Ceramic disc 6, one of the closing members, is fixed in outer casing 10 in an exact position relative to mating disc 7 by means of two balls 12. A packing ring 30 is mounted on rotary part 5.

A ring 13 is provided to act as a stop member for closing couple 6,7 and retains an O-ring 14 which prevents the cold water from flowing outside of the ceramic discs.

The entire cold water control assembly is closed by a screw plug 15 that carries packing rings 16 and 17 for preventing water from escaping into the volume control knob 4. A stop ring 18, centered on the outer diameter of the screw plug 15 limits the rotary motion of the volume control knob 4. To ensure an accurate positioning, stop ring 18 is centered in a slot b of casing tube 10. A disc 19, fixed by a safety ring 20, forms a bearing surface for the biasing spring 9 and a safety stop for cam ring 8.

At the left hand side of the mixer, as shown in the drawing, the desired temperature is adjusted by means of a knob 21.

This control is performed chiefly through two cooperating elements, namely a control spring 23 received in the knob 21 and a thermal expansion element 22. The thermal expansion element 22 contains an expanding substance that may be a refrigerant, such as a Freon refrigerant, or a liquid, but a bank of bimetal cup springs (not shown in FIG. 1) may be also employed for the actuation. Upon heating, the expansion element 22 extends axially and produces a definite force which may be controlled by means of a spring force, that is, the two forces oppose each other and the result may be indicated on a scale. The spring 23 and the expansion element 22 are connected to each other by a piston rod 24. The piston rod 24 actuates a control cylinder 25, so that ports c and d, preferably in the form of bores or slots, are open or closed more or less, depending on the adjustment. If control cylinder 25 is displaced to the left (direction x), port c is throttled and less hot water flows into a mixing space 4. On movement to the right (direction x) port d clears more to admit more circumfluent cool water from space a into mixing space e, so that the temperature of the mixed water is lowered.

The assembly, at the left, which also has a compact construction, is mainly supported by a rotary supporting part 26. The closing seats of the temperature control cylinder 25 are a press-fitted ring 27 and a ring 28 cemented in place. The sealing surfaces are provided with a vulcanized rubber coating having a thickness of about 0.5 mm.

In order to maintain as far as possible, a force balance between set-point or control spring 23 and thermal expansion element 22, calcification and frictional forces produced by the sealing resistance of an O-ring 50 against cylinder 25, as well as packing ring 51 and supporting part 26, must be eliminated. The piston rod 24 and control cylinder 25 are chemically nickel-plated, or coated with a Teflon non-stick coating, or made of stainless steel in order to make these components resistant to calcareous deposits.

At the hot water control side, a closing couple of ceramic discs 6',7' is mounted in the same way as discs 6,7 at the cold water control side described above (at the right in FIG. 1). The shape and size of discs 6, 6', 7, 7' at both the hot water and cold water side are identical as is the mounting of rotary supporting part 26 in outer casing 29, namely in a ball bearing 11'. A ring 31 is cemented in place as a stop for ceramic disc 6',7' and for receiving a packing ring 30'. Cam ring 8', helical spring 9', disc 19' and safety ring 20' correspond to the similarly numbered elements at the other side and have the same function and size. The entire control assemby is closed by a screw plug 32. Packing rings 16',17' have the same size and function as rings 16,17. A temperature is set at the rear of screw plug 32, by turning knob 21 which is carried on a rotary bolt 33. The rotation of the knob 21 is transferred through a serration on the rotary bolt 33 to a spring guide 34 which is thereby pushed against the control spring 33 to further transfer the force to a bearing disc 35. The control cylinder 25 is thereby displaced and the hot water port c clears further, that is, the temperature of the mixed water rises. A stop ring 36 prevents the temperature control from exceeding a predetermined movement. A safety stop 38, provided in the temperature knob, prevents a full rotation to hot. The safety stop, however, may be overriden by pushing the knob in. This is a protection against scalding and for children.

To ensure a smooth rotation of the temperature knob 21 or rotary bolt 33, a slide disc 37 is placed between rotary bolt 33 and safety ring 38. To prevent an angular displacement of the spring guide 34 and the stop ring 36, both parts are formed with cams g and h which slide in grooves of screw plug 32. To obtain a smooth rotary motion between piston rod 24 and a bearing disc 35, a ball may be provided at this location f. With a strong frictional resistance at f, bearing disc 35 would poorly slide in groove and the rotary motion of the inner part would be hindered. The two assemblies, namely the cold water and hot water control, are united into a common cartridge enclosed in an outer casing 39.

The synchronous rotary motion of ceramic disc 7, 7' is transmitted by a connecting tube 40 which is provided with special teeth, and the teeth of connecting tube 40 are so designed that any longitudinal extension can be taken up within the cartridge. To increase the stability against torsion, ribs are provided on the inside surface of the connecting tube 40 by which expansion element 22 is centered at the same time.

To be able to adjust the temperature control, a spring 60 is more or less biased by means of an adjusting bolt 41. The adjusting spring serves at the same time as an excess-pressure safety. To simplify assembly, this unit with disc 43 and safety ring 44 is inserted in preassembled state. To prevent water from escaping along the adjusting bolt 41, an O-ring 48 is inserted which is held in place by a pressure-fitted ring 45.

To prevent cold water from flowing directly into the outlet without passing through the mixing space, an O-ring 46 is inserted adjacent thereto.

The outer O-rings 52, 52' are intended to seal and limit the cold and hot water inlet channel.

To obtain a smooth motion in the volume control and prevent a circulation between the volume control and the temperature control, double-lip packing rings 30, 30' are inserted. A satisfactory tightness and smooth displacement in rotation are also required at packing rings 16, 16', 17, 17'.

The ceramic discs are composed of an oxide ceramic material and the two mating surfaces are lapped to provide a surface finish that results in an adhesive force insuring an absolute tightness even during a displacement. The magnitude of the adhesive force is such that no biasing of the discs by a spring nor a tightening disc is necessary. The biasing elements are built in only to prevent a lifting on the occurrence of a back pressure or vacuum in the lines, and to facilitate the assembly. The passages are gradually closed by turning one disc relative to the other through approximately 85 degrees. The turning reduces or enlarges the cross section area of flow. One of the discs is secured against rotation by two plastic balls provided at the outer circumference and exactly fitting the groove. The mating disc is exactly centered and rotated by cam disc 8.

The described fitting for mixing cold and hot water to a predetermined temperature is generally employable in sanitary installations, especially showers and bathrooms. It is designed for wall mounting, i.e., can be connected to any hot and cold supply system. The predetermined mixed water temperature can be kept constant substantially irrespective of the volume supplied and the supply pressure, due to the control system's utilization of an expansion element and an adjustable control spring. The volume and temperature are controlled by means of two coaxial knobs on the opposite ends. The volume is controlled with two ceramic discs sliding on each other, not with conventional valve seats. Each water supply is shut off separately, which eliminates an inner circulation. Dirt particles cannot affect the function and, hence, filters may be omitted. The volume control is completely separated from the temperature control. The design is such that cold water flows around substantially the entire mixing space. The rotary ceramic disc is permanently pressed against the fixed mating disc by the line pressure; this results in an absolute tightness even at higher pressures. However, to avoid a lifting during a vacuum which may occur in the supply lines, a bias by a spring is provided. A mounting in ball bearings insures a smooth rotation of the biased inner parts.

Figure 2:
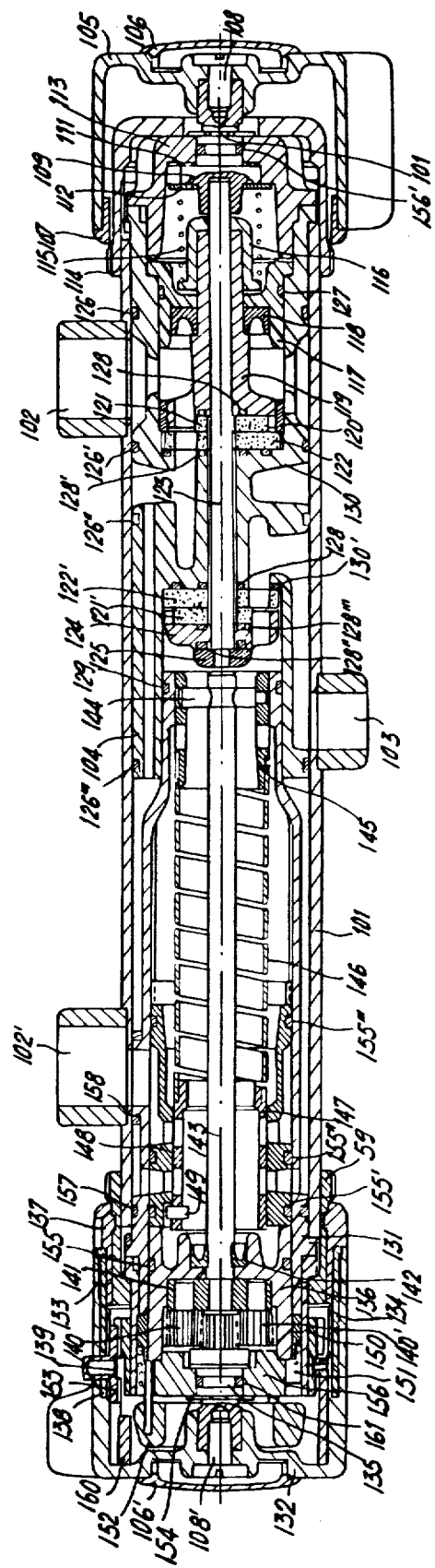
FIG. 2 is an axial section which shows a mixer having temperature volume and control assemblies accommodated in two separate cartridges connected to each other.

In the mixer shown in FIG. 2, the control assemblies for temperature and volume are accommodated in separate cartridges. This mixer controls the mixing temperature by means of a rust-proof bimetallic thermal coil. The coil exerts a torsional force on a slide which controls the inward flow of cold and hot water, depending on the adjustment, and maybe necessary correction. This coil insures a fast, exact, and secure control. Naturally, another type of thermal element may also be provided.

The volume cartridge is a compact unit having a glass-reinforced plastic casing as the main supporting part. The assembly of a complete cartridge is very simple. The cartridge is shifted into the smooth bore of housing 101, up to a stop edge provided on volume cartridge 104. At the same time, two cams provided on the volume cartridge are frontally shifted into corresponding grooves provided on the housing. The volume cartridge is thus secured against rotation and positioned at the same time. The cartridge is held in place by a cap screw which is secured to the housing by a thread. During the mounting and dismounting of the cartridge, there is no need for unscrewing the knob. All component parts of the cartridge are so assembled that they remain connected to the cartridge even if not yet inserted, and do not fall off.

The mixed water flow is controlled through a volume knob 105. The knob is engaged onto the serration of a spindle 109, to obtain a positioning of the knob. Knob 105 is held in place by a screw 108 which is frontally screwed into a tapped hole cut in spindle 109. The screw is covered by a rosette 106 which is lightly pressed-fitted on the knob. This is primarily a decorative provision for preventing, in addition, a malevolent removal of the knob. If knob 105 is turned, spindle 109 turns therewith. This rotary motion is limited by a cam provided on spindle 109 and abutting against stop edges in a thrust casing 113 upon being turned about 160 to 170 degrees. The stop in thrust ring 113 may be displaced by means of a serration meshing with volume cartridge 104. The force is further transmitted through a hexagonal drive bar 123. The hexagonal drive bar 123 (which also may be serrated or have two surfaces, however) is engaged in a hexagonal socket of spindle 109. The connection is cemented with loctite cement and thereby secured. The drive bar 123 is also inserted in a hexagonal hole of a driver 119. Driver 119 is thus taken along and its cams engage a control disc 121 to rotate the same on another disc 122 (inlet disc) which is secured against rotation in the volume cartridge.

The drive bar 123 also extends into volume cartridge 104 to a driver 124. Driver 124 also has a hexagonal hole for engagingly receiving the drive bar. Driver 124 is pressed onto control disc 121' by means of a nut 125 which is screwed on drive bar 123, so that disc 121' and disc 122' becomes biased against one another to prevent a disengagement of the discs from each other. Nut 125 is secured to drive bar 123 and tightened thereto with Loctite cement. Driver 124 which is engaged with control disc 121' by cams is, therefore, turned along with driver 119. The result is that cold water and mixed water are shut off or turned on simultaneously. Consequently, in the shut-off position, two water passages are closed and no circulation can take place. The cold water must be turned on about 3 to 4 degrees in advance of the mixed water to securely bridge the clearance loss and, from the point of view of noise suppression, to obtain a pressure loss upstream of the mixed water couple, whereby the noise is reduced and also the noise at the inlet at the cold water couple is attenuated.

Like the volume cartridge, the temperature cartridge is also a compact unit having a plastic casing 131 as its main supporting part. The primary function of this cartridge is to bound or seal a space. Amongst others, it bounds the large mixing space to the outside, and housing 101 remains cool and the user is protected against burns. About ninety percent of the outer zone of the housing is in contact with cold water.

It is very easy to place the temperature cartridge into the housing. The cartridge is introduced from the left into the smooth bore of housing 101 until a shoulder of the cartridge butts against a stop in the housing. Simultaneously, two cams are frontally slid into corresponding grooves of housing 101 and thus positioned and secured against rotation. The cartridge is held in place by a cap screw 159 which is secured to the left external thread of housing 101. About in the middle of the housing, the temperature and volume cartridges are coupled to each other by simple plugging with an O-ring 129 providing for tightness.

The temperature is preset by means of temperature knob 132. The knob carries a temperature graduation scale 133 which permits an accurate temperature adjustment by the user in connection with a mark on a marking ring 127.

To forestall unintentional excess temperatures, a scald-guard button 138 is provided in temperature knob 132. If a temperature higher than 38° C., for example, is desired, button 138 must be pressed to override the edge of stop 153. Upon turning the knob back to a temperature lower than 38° C., a spring 139, secured to an insert 160, pushes button 138 into its initial position again. The stop for the lowermost and uppermost settable temperature is also provided between scald-guard button 138 and stop 163 which latter can be positioned and adjusted by means of a serration on cover 156.

The rotary motion of temperature knob 132 is transmitted to a spindle 135 through a serration. The spindle 135 is geared and has teeth which mesh with two geared pistons 140 and 140'. The geared pistons are mounted in a driver 141. Teeth are also provided in upper part 136 and they engage with the geared pistons. Now, if spindle 135 turns, the two geared pistons 140 and 140' are taken along. Since they further mesh only with the teeth in the upper part, the entire driver 141 is turned. The gears are dimensioned to obtain a reduction of 3 to 1. Driver 141 is firmly connected to a transmission bar 143 which, in turn, is connected through a bolt 144 to a receiver 145 which is mounted in a cylindrical portion of the temperature cartridge 131. A bimetallic coil 146 is secured to the receiver 145 by cementing, brazing, or spot welding. The coil is further secured to an inner rotary slide valve 147. This makes a presetting possible. Upon a temperature deviation, the coil can respond and rotary slide valve 147 turns accordingly. Milled in rotary slide valve 147 are slots which now become aligned with the inlet ports of inlet tube 148, depending on the desired temperature. The volume ratio for the desired temperature can thus be determined. In this manner of mixing, a clearance loss cannot be avoided. This clearance loss must be minimized to ensure that the desired mixing will not be effected.

Another advantage of the mixer is that a base point can be set, without the removal of the temperature cartridge.

The control and shutting off is thus effected separately in the respective cartridges. This design necessarily follows from the fact that two identical ceramic disc couples which are employed, in practice, do not require maintenance. To avoid recirculation loss the two ceramic couples are so disposed that the cold water and mixed water are shut off or turned on in parallel to each other. Because of the use of ceramic discs, prefiltering at the connections for cold and hot water is omitted.

About ninety percent of the inner zones of the periphery of the housing are in contact with cold water. This practically eliminates any danger of burns upon touching the mixer unit. The provided use of plastics for the supporting parts of the temperature and volume cartridges leads to an inexpensive and economical manufacture. Longitudinal expansions and manufacturing tolerances are compensated for by a spring. Upon a failure in cold water supply, the active component expands and turns the rotary slide valve until the hot water is shut off. The mixed water does not pass through the housing. This results in the advantage that a cast housing with a cast mixing space is not needed. The large mixing space permitting an ample flow around the bimetallic thermal elements is a further advantage of the mixer.

Only two dynamic seals in the form of packing rings are employed in the entire system.

The combination of ceramic discs as control members and a rotary slide valve is not susceptible to troubles caused by calcareous or dirt deposits. This increases the reliability in operation of the thermostat.

In the third embodiment shown in FIG. 3, a cast housing 201 is provided. A volume control cartridge 204 and a temperature cartridge 231 are inserted in a housing from the two ends thereof. Unlike in the preceeding embodiment, the inner ends of the two cartridges 203, 231 are not tightly engaged with each other. The two cartridges 204, 231 are fixed to the housing ends each by means of two screws which extend radially through housing 201. (as indicated at s).

The two inlet connections 202 and 202', extending through the housing wall, for cold and hot water are each provided with an inwardly-conically-spreading muffling sleeve 271 of rubber or plastic which is supported by a bearing sleeve 270. The soundproofing effect of the sleeve 271 acting as a kind of a venturi tube is still intensified by an annular clearance 272 left between the two sleeves 270 and 271.

In this embodiment again, only a negligibly small portion of the housing wall is in direct contact with hot water. Particularly, a relatively wide cold water channel 273 extends at the front side of housing 201 remote from the wall (below in FIG. 3), so that scalding is positively prevented. Otherwise, this embodiment substantially corresponds to that of FIG. 2, that is, a first ceramic disc couple 221, 222 for cold water control and a second ceramic disc couple 221', 222' for mixed water control are provided.

Thus, in accordance with the invention, a thermostatically controlled mixer or combination faucet set for cold and hot water is characterized in that separate assemblies for controlling the temperature and the delivered flow volume are provided in the form of a common or two coaxial cartridges which can separately be inserted into, or removed from, a housing, with the control of both the cold water supply and the supply of hot water or the volume of delivered mixed water being effected each by means of a couple of ceramic discs are rotatable relative to each other and provided with flow ports. In accordance with preferred features of the invention the two assemblies for controlling the temperature and the volume are inserted in the form of a single cartridge into a tubular housing open at both ends, with the hot water as well as cold water supply to the mixing chamber which is provided in the middle zone of the housing and accommodates the thermal element, being adjustable each by means of a couple of ceramic discs by a knob which is provided on one end of the housing, while the temperature control is effected by means of a second knob acting on the thermal element and provided on the other end of the housing. Preferably, the two ceramic disc couples for controlling the volume, of which one controls the cold water supply and other controls the delivered volume of mixed water, are accommodated in a first cartridge inserted in a tubular housing and are actuable from one end of the housing by means of a knob, while the temperature is controlled by means of thermal element which can be set by a knob from the other side of the housing, with the thermal element operating on a rotary slide valve controlling the hot water supply, and the rotary slide valve and the thermal element being accommodated in a second cartridge which is inserted in the tubular housing in a position coaxial with that of the first cartridge.

In accordance with further features of the invention, at least the inner portions of the housing which extend between the hot water and the cold water connections of the housing and conduct hot or mixed water, or both, are skirted by the stream of cold water. The two ceramic disc couples are mounted in a first cartridge which is inserted in a cast housing from one end thereof, and serve the purpose of controlling the volume of cold water or mixed water, with the two cartridges being fixed in the cast housing by means of radially extending screws.

In accordance with still another feature of the inventive arrangement, only a small part of the housing wall is in contact with hot water, and that a relatively wide channel conducting cold water is provided at the housing front side remote from the wall. In accordance with even still another feature, the invention is characterized in that an inwardly conically flaring soundproofing sleeve of rubber or plastic is inserted in the inlet connection for cold and hot water of the housing, which sleeve is seated in a supporting sleeve while leaving an annular cavity.

The mixer, according to the invention, may control the mixing temperature by means of a rust-proof bimetallic thermal coil. The coil exerts a rotating force on a rotary slide valve controlling the inflow of cold and hot water, in order to control the temperature. The control and shutoff is effected in two self-contained cartridges, a volume cartridge and a temperature cartridge. The volume cartridge includes two couples of ceramic discs. Cold and mixed water are controlled simultaneously. About ninety percent of the housing wall is contacted by the circumfluent cold water.

While specific embodiments of the invention have been shown and described in detail to illustrate the application of the principles of the invention, it will be understood that the invention may be embodied otherwise without departing from such principles.

What is claimed is:

1. An improved thermostatically controlled mixer of cold and hot water comprising an elongated housing with an elongated mixing chamber for mixing the cold and hot water, a cold water inlet for passing cold water to the chamber, a hot water inlet for passing hot water to the chamber, a mixed water outlet connected to the chamber for passing a flow of the mixed cold and hot water from the chamber, a first control cartridge mounted to the housing for regulating the flow of cold water into the mixed chamber and for regulating the flow of mixed water from the mixing chamber, wherein said first cartridge comprises a first pair of ceramic discs rotatably mounted relative to and sealingly against each other, each disc of said first pair of ceramic discs having a port extending therethrough to establish fluid communication from the cold water inlet to the mixing chamber upon alignment thereof, said first cartridge further including a second pair of ceramic discs rotatably mounted relative to and sealingly against each other, said second pair of ceramic discs being mounted between the mixing chamber and the mixed water outlet, each disc of said second pair of ceramic discs having a port extending therethrough to establish fluid communication from the mixing chamber to said mixed water outlet upon alignment thereof, and a second cartridge mounted to the housing including a thermally responsive element mounted in the mixing chamber and a slide valve connected to said thermally responsive element and slidably mounted in said second cartridge for regulating the flow of hot water from the hot water inlet to the mixing chamber responsive to the operation of said thermal element.

2. The improved mixer as set forth in claim 1, wherein said first cartridge and said second cartridge are coaxially mounted in the housing.

3. A thermostatically controlled mixer of cold and hot water, comprising a tubular housing having a chamber for mixing the water, a separate cold water inlet and hot water inlet to the chamber, a mixed water outlet from the chamber, a first cartridge mounted in said housing having two pairs of ceramic discs, each pair of discs mounted adjacent each other for controlling a supply of water, each disc of each pair of ceramic discs being rotatable relative to each other and each ceramic disk having ports for the passage of water therethrough, a first pair of said ceramic disks being operative to control a cold water supply from said cold water inlet to said mixing chamber and a second pair of said ceramic discs being operative to control a mixed water supply from said mixing chamber to said mixed water outlet, a second cartridge in said tubular housing coaxially mounted relative to said first cartridge, a thermally responsive element in said cartridge and a slide valve slidably mounted in said second cartridge and operatively connected to said thermally responsive element for controlling a flow of hot water from said hot water inlet to said mixing chamber.

4. A mixer according to claim 3, wherein said tubular housing is open at both ends, said first cartridge disposed in and mounted at one of said open ends and said second cartridge disposed in and mounted at the other of said open ends, a first knob connected to said two pairs of ceramic disks for moving one disk in each pair in relationship to another disk in each pair, and a second knob operatively connected to said thermally responsive element for setting the operation of said thermally responsive element.

5. A mixer according to claim 4, wherein said housing includes a wall portion defining a cold water flow path from said cold water inlet to said mixing chamber disposed substantially around the outside of the portions of said housing defining a hot water and a mixed water flow path.

6. The mixer according to claim 5, wherein only a small part of the housing wall is in contact with hot water, and said housing includes a relatively wide channel conducting cold water remote from said wall.

7. The mixer according to claim 3, further comprising an inwardly conically flaring soundproofing sleeve inserted in each of said cold water inlet and hot water inlet of said housing, a supporting sleeve for supporting said soundproofing sleeve at a spaced relationship therefrom to define an annular cavity therebetween.

* * * * *